United States Patent [19]

Walczak

[11] Patent Number: 4,583,823

[45] Date of Patent: Apr. 22, 1986

[54] DEVICE FOR FOCUSSING LENS

[75] Inventor: Andrzej Walczak, Ober-Morlen, Fed. Rep. of Germany

[73] Assignee: MAP Mikrofilm Apparatebau Dr. Poehler GmbH & Co KG, Fed. Rep. of Germany

[21] Appl. No.: 618,137

[22] Filed: Jun. 7, 1984

[30] Foreign Application Priority Data

Aug. 11, 1983 [DE] Fed. Rep. of Germany ....... 3329003

[51] Int. Cl.$^4$ .............................................. G02B 7/04
[52] U.S. Cl. ...................................... 350/255; 74/56; 74/569
[58] Field of Search .............. 74/99 A, 99 R, 56, 567, 74/569; 350/247, 252, 255

[56] References Cited

U.S. PATENT DOCUMENTS 2,164,847  7/1939  Trautmann ........................ 350/255

OTHER PUBLICATIONS

Ball, "Rotary to Linear Motion", *Product Engineering*, vol. 33, No. 7, Apr. 2, 1962, pp. 68 to 73.

*Primary Examiner*—Bruce Y. Arnold
*Assistant Examiner*—William Propp
*Attorney, Agent, or Firm*—Wegner & Bretschneider

[57] ABSTRACT

The lens holder of a lens focussing device is axially movable in a lens sleeve supported on a film holder on which it can slide. The rim of a focussing wheel is accommodated in the space between the collar of the lens and the top face of the lens sleeve. The rim thickness increases uniformly along half its periphery. This results in a relative movement of the lens holder and the lens sleeve when rotating the focussing wheel. The focussing wheel is axially deformable. Notwithstanding the focussing wheel being firmly mounted, this provision allows limited axial movement of the lens sleeve, rendering it possible for the lens sleeve to follow the course of the upper plate of the film holder.

9 Claims, 2 Drawing Figures

DEVICE FOR FOCUSSING LENS

BACKGROUND OF THE INVENTION

This invention relates to a device for focussing a lens held in a lens holder. The latter can be moved axially in a lens sleeve supported on a film holder on which it can slide. Devices of this nature are, for example, used in microfilm readers and are therefore commonly known.

Since the lens sleeve is supported on a film holder on which it can slide, the distance between the microfilm and the lens remains constant when traversing the film holder providing the thickness of the upper transparent film holder plate is constant and the microfilm lies level in the film holder. Practice has shown that irregularities in the thickness of the upper plate across its surface often necessitate refocussing the lens when traversing the film holder. This type of refocussing also becomes necessary when the plane of the film holder is not exactly at right angles relative to the lens. In such cases one can observe that the lens sleeve moves up and down when the film holder is traversed. Since the lens sleeve must be vertically movable, it is necessary that movable transmission elements between the focussing wheel and the lens be provided which allow the required vertical movement of the lens sleeve. The provision of movable intermediate transmission elements render the known lens focussing device rather complex. This leads to microfilm readers with two lenses of different focal lengths usually being provided with only one focussing unit that always adjusts both lenses simultaneously and parallel to each other. Hence, switching from one lens to the other invariably necessitates refocussing.

SUMMARY OF THE INVENTION

It is a primary object of the present invention to provide a device of the nature stated above allowing axial movement of the lens sleeve and featuring as simple a design as possible.

This object is accomplished by providing a device for a focussing lens held in a lens holder with the latter being axially movable in a lens sleeve supported on a film holder on which it can slide. Said device comprises a focussing wheel pivotable about an axis parallel to the lens, part of the exterior faces of said lens sleeve and a collar of the lens. The thickness of said focussing wheel varies along its periphery and the focussing wheel is axially deformable.

The main advantage of the device of the invention lies in its extremely simple design. Instead of providing deformable intermediate elements, the invention includes a focussing wheel that is itself axially deformable. This gives overall design simplicity and functional advantages to the device. Due to the absence of intermediate elements, focussing can be affected directly and free of play, rendering it possible to achieve sensitive adjustment.

The focussing wheel is especially simple in its design when composed of an external rim, the thickness of which varies along its periphery, and a thin-walled wheel center supporting the rim.

The required axial deformability of the focussing wheel can be achieved by designing the wheel center as an elastic diaphragm.

As an alternative, it is also possible to provide one or several arcuate cutouts or one spiral cutout in the focussing wheel center.

It is furthermore advantageous for the focussing wheel to have a peripheral web pointing radially outward that meshes with a groove in the lens sleeve. Hence, the focussing wheel automatically moves downward together with the lens sleeve when the latter follows a downward movement of the film holder. Without this web, adverse conditions might lead to the rather heavy lens sleeve moving downward and the focussing wheel retaining the lens in its position. In other words, the focussing wheel would hold back the lens, resulting in a loss of sharp focus.

When the focussing wheel is elastically prestressed in the direction of the film holder, it acts as a hold-down device for the lens sleeve. It ensures that the entire lens sleeve always makes direct contact with the film holder. In such a case, the focussing wheel functions similarly to a diaphragm spring.

In a preferred embodiment the focussing wheel comprises an external rim whose thickness increases uniformly along half its periphery and decreases uniformly towards the starting point, and a thin-walled web supporting the rim, thereby making it possible to adjust the lens evenly in one direction when the focussing wheel is rotated through 180°.

In case it is not ensured that the film holder can be traversed in a plane that is always at right angles in relation to the lens, provision must be made that the lens sleeve and the lens holder can follow the film holder that can be traversed at inclined angles relative to the lens holder, so as to prevent a loss of sharp focus. In order to prevent the tilted focussing wheel from lifting the lens holder in relation to the lens sleeve, it is expedient to dome the top face of the focussing wheel. Several designs are possible on the basis of the invention. In order to exemplify their basic design principle, one of the possible designs will be shown in the attached drawing and described in the following description, it being understood that other designs fall within the scope of the invention.

DESCRIPTION OF THE PREFERRED EMBODIMENT

Figure 1:
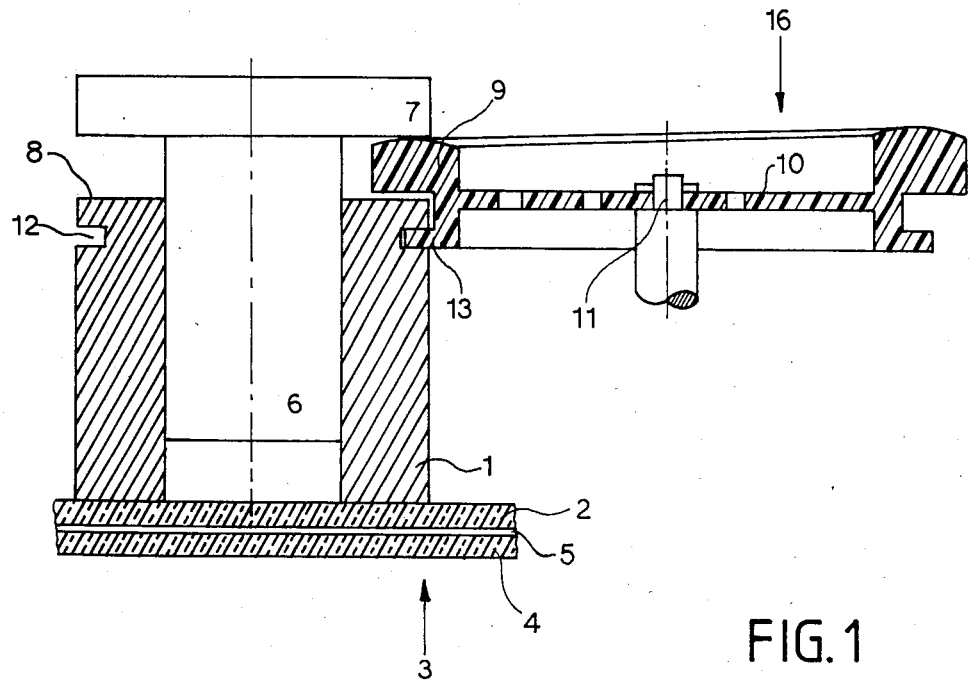
FIG. 1 shows a schematic section through one portion of a microfilm reader relating to the invention with a focussing unit according to the invention.

FIG. 1 shows a lens sleeve 1 supported on an upper transparent plate 2 of a film holder 3 on which it can slide. The film holder 3 furthermore features a lower transparent plate 4, hence rendering it possible to place a microfiche 5 between the two plates 2 and 3.

A lens holder 6 is axially movable in a lens sleeve 1. The frames of the microfiche 5 are magnified by the lens held in the lens holder 6 and projected onto the screen of the microfilm reader not illustrated in the drawing.

The lens holder 6 has a collar 7 reaching over the top 8 of the lens sleeve 1. The rim 9 of a focussing wheel 16 is accommodated in the space between the collar 7 of the lens holder 6 and the top face 8 of the lens sleeve 1. This focussing wheel 16 is composed of a relatively thin-walled web 10 and a rim 9. The web 10 is preferably an elastic diaphragm. The thickness of the rim 9 is not even along the periphery of the focussing wheel 16, but it increases uniformly over 180°. The center of the focussing wheel 16 is mounted pivotably on a shaft 11 connected to the lens carrier (not illustrated in the drawing) of the microfilm reader. When rotating the focussing wheel 16, a rim of lesser or greater thickness depending on the rotation is accommodated in the space between the collar 7 of the lens holder 6 and the top face 8 of the lens sleeve 1 and moves the lens holder 6 in relation to the lens sleeve 1.

FIG. 1 furthermore shows that the lens sleeve 1 contains a peripheral groove 12 spaced apart from the space between collar 7 and top face 8. The focussing wheel 16 has a peripheral flange 13 pointing outward that is adapted to mesh with the groove 12. This provision results in the relatively heavy lens sleeve 1 automatically bending the focussing wheel 16 down when the lens sleeve 1 moves down, for example when following an inclination of the film holder. Without the interaction between flange 13 and groove 12, the focussing wheel 16 might retain the lens holder 6 with the lens sleeve 1 moving downward. This would result in a movement of lens and lens sleeve relative to each other.

Figure 2:
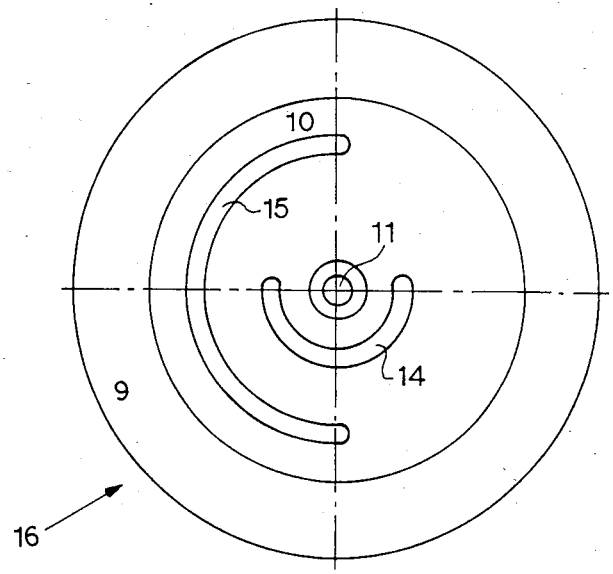
FIG. 2 shows a top view of a focussing wheel according to the invention.

The axial deformability of the focussing wheel 16 necessary to allow axial movement of the lens sleeve 1 is accomplished by making the web 10 relatively thin. Furthermore, as shown in FIG. 2, two arcuate cutouts or slits 14 and 15 are provided in the web 10. With the design illustrated in the drawing, the cutouts 14 and 15 are in the form of semi-circles of different diameters. A single spiral cutout can be provided instead of the two cutouts 14 and 15. It is also possible to connect the rim 9 with a hub area of the focussing wheel 16 by means of spokes. The design illustrated in FIG. 1 features a domed top face of the rim 9. This prevents any displacement of the lens holder 6 relative to the lens sleeve 1 when focussing wheel 16 is bent due to the lens sleeve 1 moving up or down. Once the lens has been brought into sharp focus, this sharp focus remains even when the lens sleeve 1 moves up or down on the film holder 3 due to an inclination of the latter.

Lenses having a sufficient depth of focus obviate the need for a domed top face of the rim. The top face of the rim can in this case be flat.

A design in which the focussing wheel 16 is axially movable on its shaft 11 is also possible. With this design, a relatively small axial deformability of the focussing wheel 16 is sufficient to prevent tilting of the focussing wheel 16 on its shaft 11.

What is claimed:

1. A device for focussing a lens held in a lens holder having a collar at one end thereof, with the lens holder being axially movable in a lens sleeve supported on a film holder on which the lens sleeve can slide, said device comprising:
   a. a focussing wheel pivotable about an axis parallel to the axis of the lens sleeve, part of the exterior faces of said focusing wheel being accommodated in a space between the lens sleeve and the collar of the lens holder,
   b. the thickness of said focussing wheel varying along its periphery,
   c. said focussing wheel being axially deformable.

2. A device according to claim 1, wherein the focussing wheel comprises an external rim, the thickness of which varies along its periphery, and a relatively thin web supporting the rim.

3. A device according to claim 2, wherein the web is an elastic diaphragm.

4. A device according to claim 2, wherein the web contains at least one arcuate cutout to provide axial deformability.

5. A device according to claim 4 wherein the web contains one spiral cutout.

6. A device according to claim 1, wherein the focussing wheel includes a peripheral flange pointing radially outwardly adapted to mesh with a groove in the lens sleeve.

7. A device according to claim 1, wherein the focussing wheel is elastically prestressed in the direction of the film holder.

8. A device according to claim 2, wherein the thickness of the rim increases uniformly along half its periphery from a starting point and decreases uniformly towards the starting point.

9. A device according to claim 2, wherein the top face of the rim is domed.

* * * * *